(12) United States Patent
Karch et al.

(10) Patent No.: US 8,452,661 B2
(45) Date of Patent: May 28, 2013

(54) METERED ELECTRICAL CHARGING STATION WITH INTEGRATED EXPENSE TRACKING AND INVOICE CAPABILITIES

(75) Inventors: Christopher Karch, Singer Island, FL (US); Thomas McCormick, Delray Beach, FL (US); James McCormick, Queensbury, NY (US)

(73) Assignee: Red White Blue and Green, LLC, Singer Island, FL (US)

( * ) Notice: Subject to any disclaimer, the term of this patent is extended or adjusted under 35 U.S.C. 154(b) by 1082 days.

(21) Appl. No.: 12/399,467

(22) Filed: Mar. 6, 2009

(65) Prior Publication Data

US 2010/0225475 A1  Sep. 9, 2010

(51) Int. Cl.
*G06Q 20/00* (2012.01)
(52) U.S. Cl.
USPC ............. 705/16; 705/412; 705/39; 705/40; 320/109; 709/204; 340/5.2
(58) Field of Classification Search
USPC ............ 705/16, 39, 40, 34, 13, 1.1, 400, 705/412; 320/109, 2, 21; 709/204; 340/5.2
See application file for complete search history.

(56) References Cited

U.S. PATENT DOCUMENTS

| | | | |
|---|---|---|---|
| 2006/0184456 A1* | 8/2006 | de Janasz | 705/72 |
| 2007/0084523 A1* | 4/2007 | McLean et al. | 141/231 |
| 2009/0021213 A1* | 1/2009 | Johnson | 320/109 |
| 2009/0174365 A1* | 7/2009 | Lowenthal et al. | 320/109 |
| 2009/0177580 A1* | 7/2009 | Lowenthal et al. | 705/39 |
| 2010/0161482 A1* | 6/2010 | Littrell | 705/40 |

* cited by examiner

*Primary Examiner* — Vanel Frenel
(74) *Attorney, Agent, or Firm* — McHale & Slavin, P.A.

(57) ABSTRACT

A system for safely recharging and charging electrically powered vehicles, including hybrid powered vehicles, includes an electrical charging station for connecting the vehicles to a source of Ground Fault Protected electrical power, an authorization device for permitting an operator of the vehicle to utilize a secure electronic content distributor. The system also includes a metering system for recording the amount of electrical power or electricity utilized to charge or recharge the vehicle. A cover is hinged to the charging station and includes an aperture sized to secure said power cord to said electrical connection output. A locking pin assembly secures the cover in a closed position while said position indicator is engaged and maintains the cover in a closed position until an authorization to release the cover is received.

1 Claim, 6 Drawing Sheets

METERED ELECTRICAL CHARGING STATION WITH INTEGRATED EXPENSE TRACKING AND INVOICE CAPABILITIES

FIELD OF THE INVENTION

The present invention relates to charging of electric vehicles and in particular to a charging station or pylon which has an integrated tracking system for the cost of the power to charge the vehicle and a system to provide a receipt and interface with existing invoice systems for this cost.

BACKGROUND OF THE INVENTION

Electrically powered vehicles have been in existence for a long period of time. One of the drawbacks of these vehicles has been the relatively short distance these vehicles can travel on electrical power because of the amount/longevity of electrical charge their batteries can retain. As battery technology has improved and the amount of an electrical charge retained by a battery has increased, these vehicles can now travel reasonable distances. However, even with recent advances in battery technology once these vehicles have traveled a few hundred miles their batteries need to be recharged. Recently, as a result of very high petroleum based fuel prices, there has been a renewed interest in these vehicles. A new demand has emerged for electrically powered vehicles. As more and more of these vehicles are put into service, there will be a need for the batteries in these vehicles to be charged or recharged at locations other than their normal recharging site.

These locations will need to be able to provide parking long enough for the charge to take place, access to electricity, a safe and secure method of delivering that electricity to a vehicle and a method for authorizing, billing, and accounting for the expenses associated with the charging activity.

These electric car recharging locations may include parking facilities located at transportation centers, public and private municipal parking facilities, parking facilities located at hotels, motels, casinos, entertainment complexes, parking facilities at hospital, educational, and corporate campuses, and parking facilities located at shopping mall. Until now there have been no facilities or services, other than an electrical plug in a wall, to charge and recharge these vehicles at these varying locations. There has been no system provided allow these existing facilities to provide this service. However, there currently are combination parking and electrical charging meters. A number of these, U.S. Pat. Nos. 5,297,664, 5,263,565 and 5,563,491 are discussed herein after.

DESCRIPTION OF THE PRIOR ART

U.S. Pat. No. 4,052,655 discloses a meter stand for use in recharging the batteries of battery powered vehicles including a register to indicate the cost of the recharging service and a coin operated locking means preventing disconnection of the vehicle from the meter until the cost of the recharging service has been paid.

U.S. Pat. No. 5,263,565 discloses a combined parking meter and electric energy dispensing apparatus and method can automatically provide, in response to receiving a payment, either parking time or electric energy. When electric current is being consumed by a connected electric vehicle, the invention operates in an electric energy dispensing mode and allocates a received payment thereto. When no electric current flows from the apparatus, then the invention functions in a parking meter mode and allocates the received payment thereto.

U.S. Pat. No. 5,297,644 discloses a parking meter and an electric charging meter are combined in a single apparatus. The combined charging/parking meter may be coin-operated or may be operated using an information-bearing card such as a cash card, a debit card or an IC card. In particular, the charging/parking meter includes a device for receiving and verifying a medium of payment, a device for selecting and visibly indicating some combination of parking time and electric power to be had in exchange for the medium of payment, and a charging device for connecting to and supplying power to an electric car charger inlet. The charger/parking meter may further include a fast-charge setting device for causing the charging device to operate in a fast-charge mode when an amount of parking time selected is insufficient in accordance with a normal charging mode to supply an amount of electric power selected. In addition, the charging/parking meter may further include a current limiting device for preventing overcharging and a communication device for connecting the charging/parking meter to a remote installation. The meter may be used to read information from a vehicle and send the information to a government entity.

U.S. Pat. No. 5,461,299 discloses a weatherized curb-side battery charging system that provides a mechanism for transferring electrical power to an electric vehicle to recharge its battery. The battery charging system includes a housing that is typically located at the side of a street on the curb, or at a battery charging station, for example. A retractable charging device is coupled to a power supply and mates with a receptacle device disposed in the vehicle. A variety of charging devices that may be employed in the battery charging system are disclosed. Electronic circuitry controls power supplied to the vehicle from the power supply of the charging system. In addition, an interface circuit is provided that allows a user to enter a code to use the system and that provides an identification for billing purposes, or a credit card type key that activates the system and performs the same functions. A fan is provided for cooling purposes that causes an air flow through the system. The curb-side charging system thus permits an operator of an electric vehicle to charge its battery in a convenient manner. The battery charging system allows an electric vehicle to be charged safely without any type of conventional electrical plug. The battery charging system provides a safe, convenient and weatherproof mechanism for coupling power from a voltage source to an electric vehicle to recharge its battery.

U.S. Pat. No. 5,563,491 discloses a combined parking meter/battery charger station includes a detachable remote receiver to inform the vehicle operator of charge-level status and other information. Upon sufficient payment or credit, the remote receiver is released so that it may be carried away from the charging station. The receiver includes a visual or audible indicator which may keep the operator apprised of charge status, time remaining on the meter or account information. The audible alert may be used to indicate a full charge or to warn that little time is remaining, or other conditions. Communication from the station to the receiver may either be directly from the station or, alternatively, a station may communicate with a central office associated with a plurality of the stations and broadcast may be made there from.

U.S. Pat. No. 6,614,204 discloses a charging station for a hybrid energy vehicle includes a housing, a controlled access power receptacle coupled to the housing, the power receptacle having a connector coupled to a power source, the connector for receiving a connection to supply an electrical charge to a vehicle, logic circuitry contained within the housing coupled to the power receptacle for controlling access by a user to one of the connector and the power receptacle, and an optical reader coupled to the logic circuitry for reading data associated with the vehicle from a data source remote from the optical scanner unit, where said data source is in optical communication with the scanner unit, the scanner unit communicating said data to the logic circuitry. A method of charging a vehicle includes the steps of providing a machine readable coded element associated with a vehicle, locating the vehicle sufficiently proximate to a charging station having an optical reader unit to allow the vehicle to be connected thereto, connecting the vehicle to the charging station, and displaying the coded element to the charging station optical reader unit so as to initiate flow of power from a power supply to charge the vehicle. Additionally, a method of charging a vehicle includes reading machine readable data associated with a vehicle, communicating the machine readable data to a central processing location, processing the machine readable to receive an approval signal or a disapproval signal, in response to receiving an approval signal of the data, instructing the charging station to open a power receptacle for receiving a connector allowing an electrical power connection between a power source and the vehicle, and charging the vehicle.

U.S. Published Patent Application No. 2007/0126395 discloses an automatic recharging docking station for electric vehicles or hybrid electric vehicles in which standardized uniform charging stations are positioned in public parking facilities, private parking facilities, rest stops, or the like, and by means of a retractable vehicle probe, allow the owner/user of the vehicle to attach to the charging station and recharge the batteries or storage cells of the vehicle while the owner/user is at work, shopping, or otherwise not requiring the use of the vehicle. The particular vehicle and vehicle probe would have an encrypted identification means so that its identity would be recorded when it connected to a particular recharging station, regardless of which electrical jurisdiction that charging station was located, such that the respective electric utility companies or other entity would be able to identify and bill the owner/user for the quantity of electricity drawn during a specified time period.

What is currently lacking in the art is a system for charging or recharging an electrically powered vehicles, such as hybrid vehicles, that includes a charging station or pylon into which an individual can connect their vehicle to be charged, a payment authorization system for receipt of payment of or billing for the amount of electrical power used to charge or recharge the vehicle. The billing optionally can be incorporated into an individual's bill for staying ad a hotel/motel or a customer's bill at a casino, etc.

SUMMARY OF THE INVENTION

A system for recharging and charging electrically powered vehicles, including hybrid powered vehicles, includes an electrical charging station for connecting the vehicles to a source of electrical power, an authorization device for permitting an operator of the vehicle to utilize a secure electronic content distributor (SECD) such as a credit card, a debit card, a hotel/motel electronic key card, a smart card, or other electronic credit authorization device to authorize payment for the amount of electrical power utilized to recharge or charge the vehicle. The system also includes a metering system for recording the amount of electrical power or electricity utilized to charge or recharge the vehicle. The metering system includes tracking and recording of the power and cost of the electrical power which is used to recharge or charge the vehicle. This system further is capable of producing a receipt which can be presented to an individual associated with the vehicle or an electronic transaction which can be transmitted to the credit authorization and billing system of the service provider for incorporation with charges for other being provided on a master bill. Further the system is equipped with safety features which protect the vehicle, the operator and the general public from risk of electrical shock during the charging process. Further the system is equipped with features that allow it to recover without intervention from temporary systems disruptions and continue with the charging process. Further the system is equipped with features that will allow it to discontinue the charging process in the event of non-temporary disruptions and release the vehicle while retaining a record of the charge delivered prior to release for future billing.

Accordingly, it is an objective of the instant invention to provide a charging system including a charging station for electrically powered vehicles that is in a location readily accessible by the electrically powered vehicles.

It is another objective of the instant invention to provide a charging system including a charging station for electrically powered vehicles at parking facilities located at transportation centers, public and private municipal parking facilities, parking facilities located at hotels, motels, casinos, entertainment complexes, parking facilities at hospital, educational, and corporate campuses, and parking facilities located at shopping malls.

It is a further objective of the instant invention to provide a charging system including a charging station for electrically powered vehicles which utilizes a secure electronic content distributor (SECD) to activate the charging system.

It is a still further objective of the instant invention to provide a charging system including a charging station for electrically powered vehicles which utilizes a secure electronic content distributor (SECD) to activate the charging system. In addition to a bank issued credit card, the SCED can be an electronic card or other electronic credit device that ensures that the bearer or issuing organization has agreed to and has adequate means to pay for the charging service. This may include employee identification cards, hotel/motel room key cards, casino membership cards, store credit cards, student identification cards, or any sort of specialized parking identification cards authorized for use in the specific parking facilities It is still further the objective of the individual invention to recognize which specific types of secure electronic content distributor (SECD) are authorized specific to the individual facility and/or to the individual charging station. The system will honor specific types of SECDs for which it has been previously programmed, reject those for which it has not, and display a message so indicating.

It is still yet another objective of the instant invention to provide a charging system including a charging station for electrically powered vehicles which utilizes a secure electronic content distributor (SECD) to activate the system. The SECD can be a credit card, a debit card, a smart card, etc.

It is yet another objective of the instant invention to provide a charging system including a charging station for electrically powered vehicles which can record the cost of the electrical power used to charge or recharge a vehicle and prepare an invoice of these costs to an individual receiving those services.

It is a still further objective of the instant invention to provide a charging system including a charging station for electrically powered vehicles which can utilize a SCED, such as a credit card, a debit card, a smart card, etc. to pay for the amount of electrical power utilized to charge or recharge an electrically powered vehicle.

It is a still further objective of the instant invention to provide a charging station that cannot discontinue an electrical charge without de-energizing the power supply to the device/unit for safety purposes.

It is a still further objective of the instant invention to provide a charging station that in the event of a temporary or intermittent interruption of service for what ever reason will restart and continue the charging service to completion.

It is still further objective of the instant invention to provide a charging station that in the event of an extended interruption of service will automatically discontinue the charging service and release the vehicle while retaining a record of the amount of service provided prior to disruption for billing once service has been restored.

It is a still further objective of the instant invention to provide the charging station with a power supply with Ground Fault Interruption (GFI) capability to each individual device/unit.

It is a still further objective of the instant invention to provide a locking device for the charging station that would enable charging only when "locked" to prevent theft of electrical power and to ensure the safety of the operator and others that may interact with the equipment.

It is a still further objective of the instant invention to provide an Un-interruptible Power Source (UPS) which will allow the charging station to resume service in the event of temporary short term service disruptions and/or retain in memory the amount of power dispersed and to what authorized card in case the transaction has to be prematurely terminated due to long term or permanent service disruption.

It is still further the object of the instant invention to provide a means of notifying the facilities management and the individual user charging station of the status of the specific device; "available", "dispensing electricity", "completed and awaiting disconnect", and "out of service" by means of local indication at the charging station and transmission of an electronic status message to the management system.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Electrically powered vehicles referred to herein are defined to include fully electrically powered vehicles; hybrid powered vehicles which are vehicles that include internal combustion engines and rely on electrical power some of the time for profusion of the vehicle and operation of some/all of the vehicle's systems and accessories and fuel cell powered vehicles, which operate in a manner similar to hybrid powered vehicles. These vehicles are not limited to land transportation and may include marine and aeronautical applications. Furthermore, the operation of these vehicles may be manned or unmanned.

Referring to FIGS. 1-5F a system for charging and/or recharging an electrically powered vehicle is illustrated. The system includes a charging station or pylon; a source of electrical power or electricity; an electronic authorization card or other type of authorization device; means to record the amount of electricity used to charge or recharge a vehicle; means to provide a receipt for the cost of the electricity or electrical power to an individual; means of communicating a business transaction to an existing Host Accounts Billable Department; and a programmable logic computer capable of monitoring each device, accounting for all business transactions, and communicating a series of transaction to the Host Accounts Billable Department in a user defined/specified timeframe, i.e. monthly.

Figure 1:
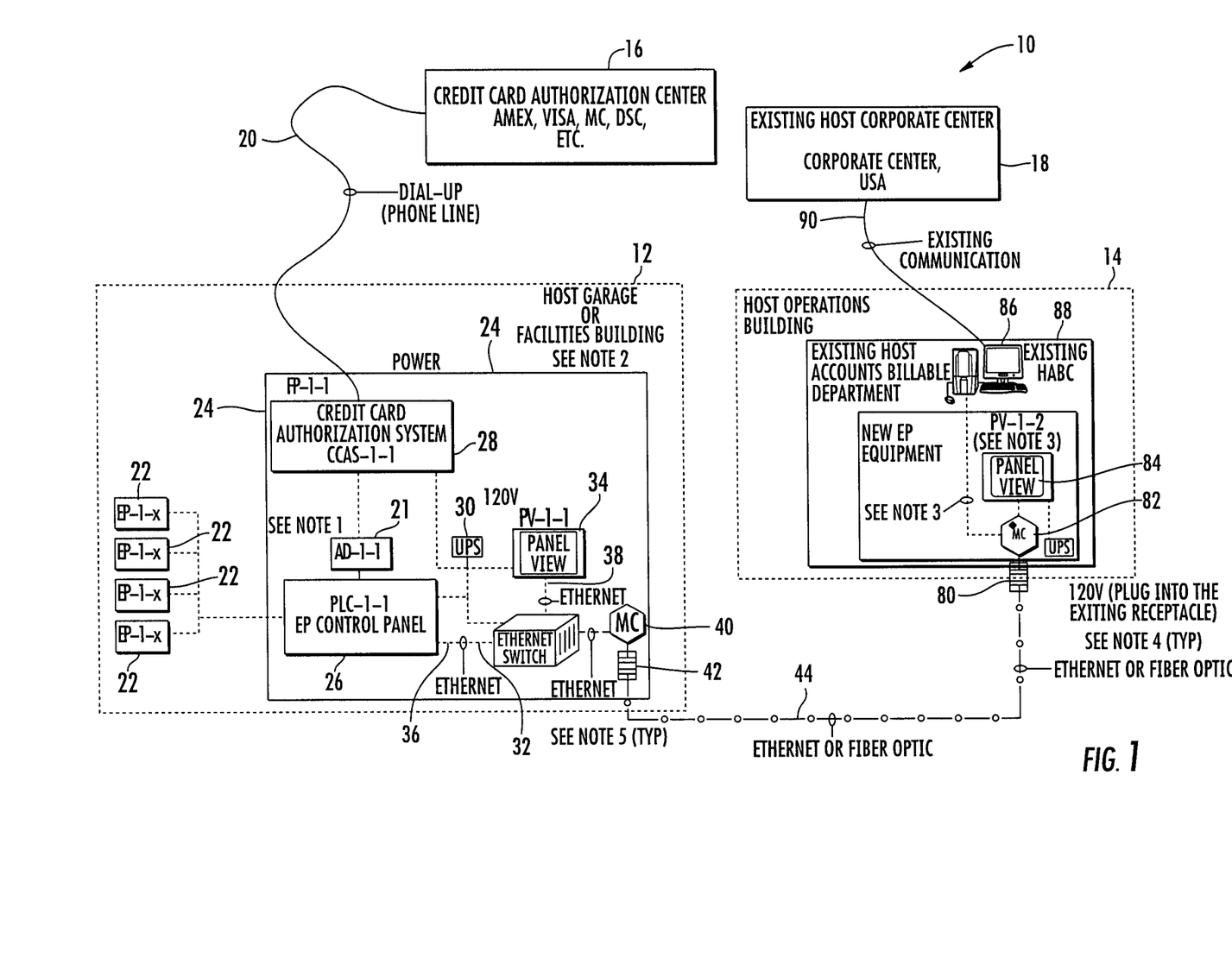
FIG. 1 is a block diagram of the system of the present invention for charging electrically powered vehicles.

The system 10 has two basic components. A host parking facility, 12 and a host operations building 14. The two components can be physically located at the same location or site. They can also be located remotely from each other. The system further includes a secure electronic content distributor (SECD) authorization center 16, such as a credit or debit card authorization center, and a host corporate center 18. The SECD authorization center 16 and the host corporate center 18 are located remotely from the parking facility 12 and the host corporate building 14. The SECD authorization center 16 is preferably connected to the host parking facility 12 utilizing a hard wire connection, such as a dial-up telephone line. Other types of connections can be used in place of connection 20, such as remote telemetry or wireless connection, etc. When a hard wire connection telephone connection is employed an automatic dialer 21 is employed. The host corporate center is connected to the host operations building via one of many types of connections such as a hard wire connection, a telephone connection, remote telemetry or wireless connection, etc.

Figure 2A:
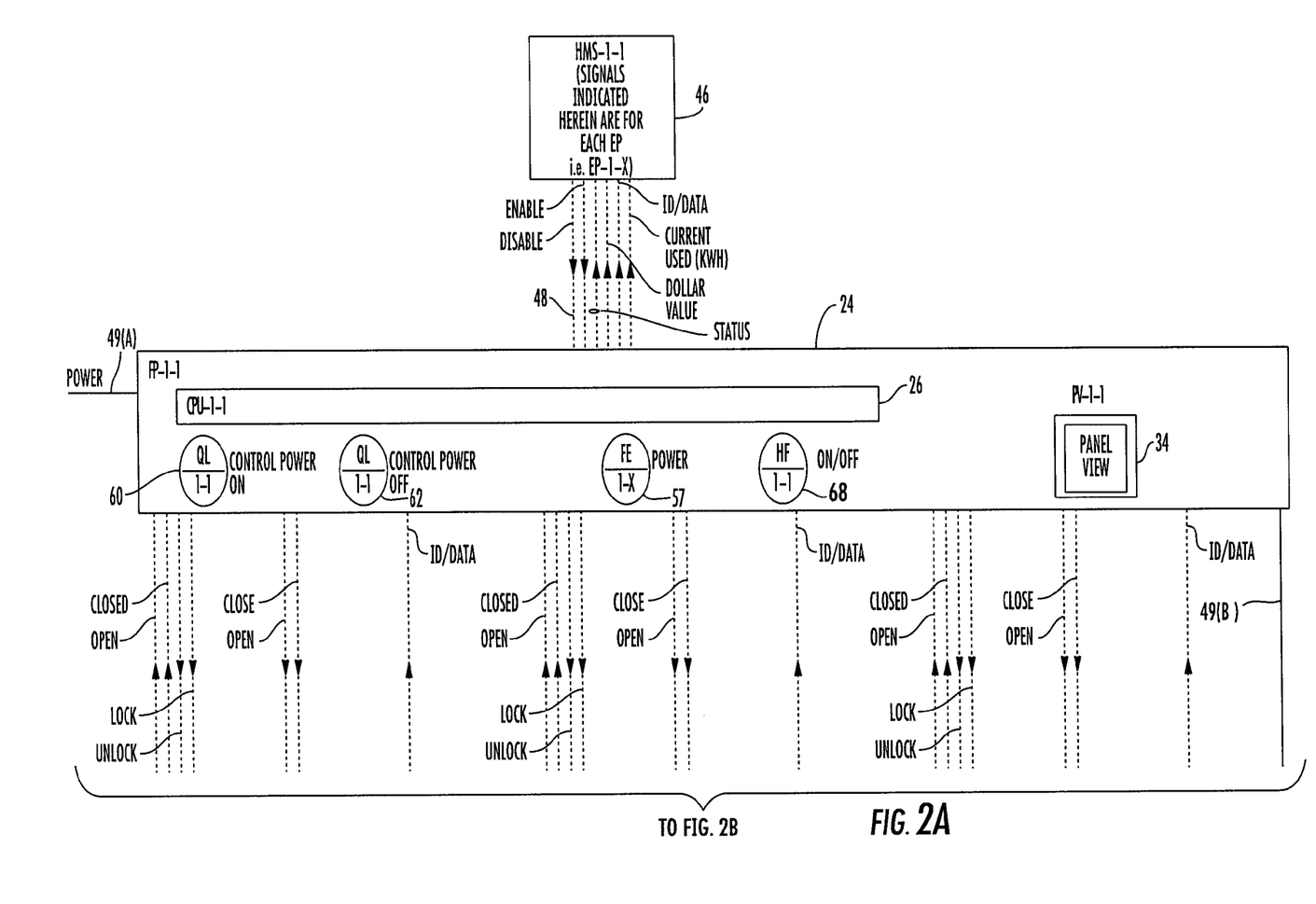
FIGS. 2A and 2B are a block diagram of the flow of power and data in the system illustrated in FIG. 1.
Figure 2B:
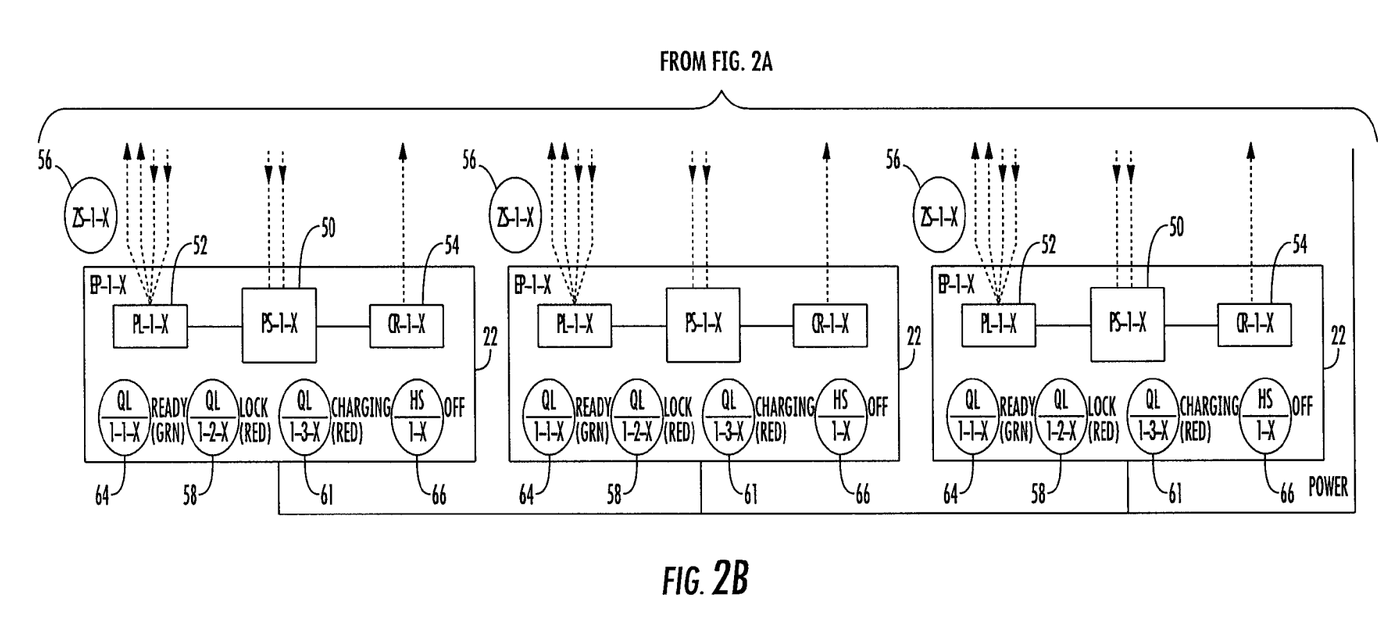
Figure 3:
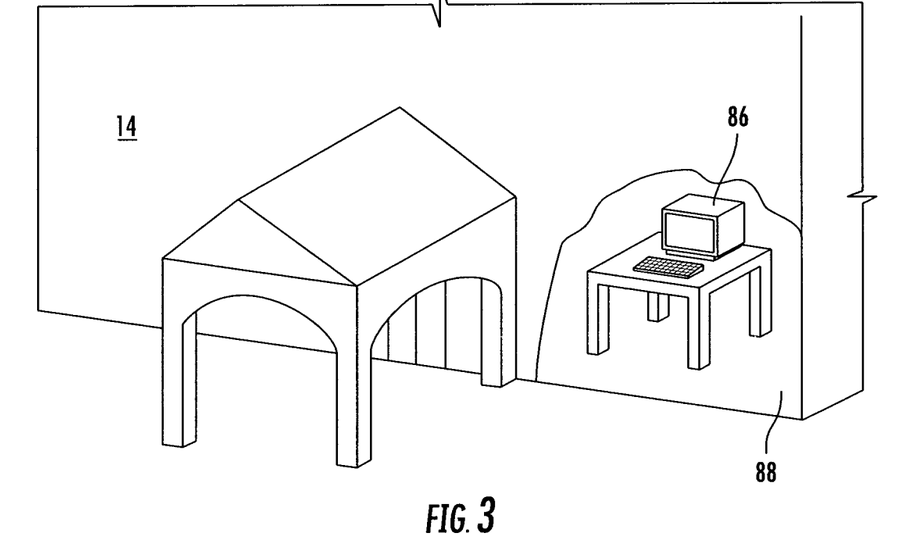
FIG. 3 is a view of the host operations building including the billing department.
Figure 4:
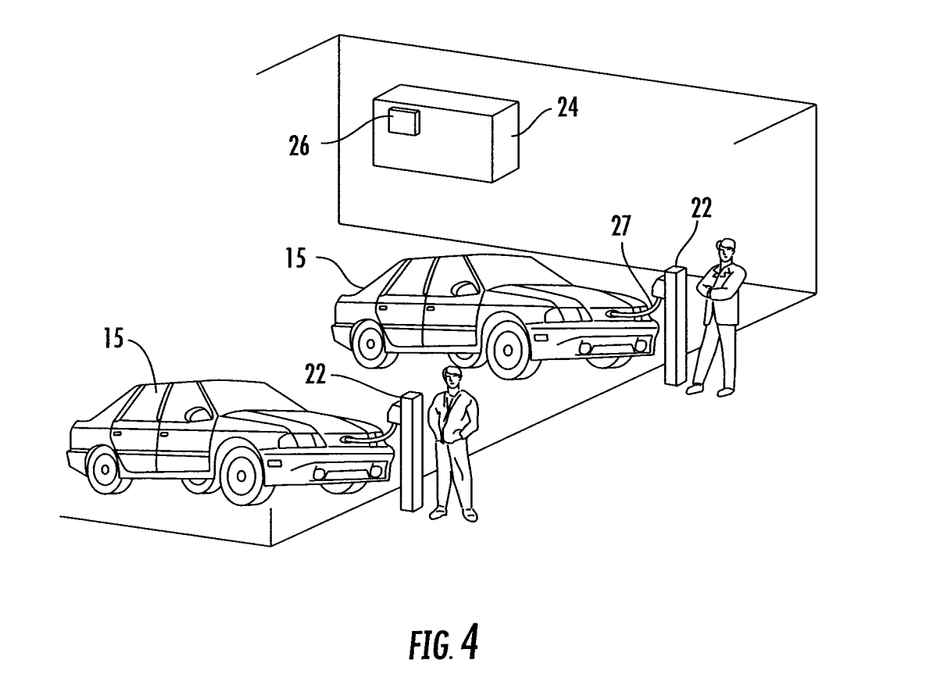
FIG. 4 is a cut away view of a host parking lot or garage/facilities building.

The host parking facility 12 can be located at transportation centers, public and private municipal parking facilities, hotels, motels, casinos, entertainment complexes, sports complexes, hospital, educational, and corporate campuses, and shopping, or other location where vehicles such as electrically powered vehicles 15 have ready access for the period of time necessitated by the re-charging process. One example would be a parking lot or garage at a hotel, motel or casino. One or a plurality of stands or charging pylons 22 are also located in the host parking facility 12. The host parking facility 12 or includes a field panel 24. As illustrated in FIGS. 1 and 2 and preferably, each field panel 24 controls and operates one or a plurality of stands or pylons 22. Alternatively, each stand or pylon 22 could have its own field panel 24. The field panel 24 includes an enclosure which may be of weatherproof and/or corrosion resistant construction however is always constructed consistent with local, state, and federal building codes. The field panel 24 may include a lockable device on the enclosure's door.

Within each field panel 24 is a computer 26 which is preferably a programmable electronic computer. An automatic telephone dialer 21 is connected between the computer 26 and a secure electronic content distributor (SECD) authorization system 28. The SECD may include employee identification cards, hotel/motel room key cards, casino membership cards, store credit cards, employee or student identification cards, or any sort of specialized electronic parking identification cards authorized for use in the specific parking. The SECD authorization system will normally utilize a SECD reader. This reader can be a credit/debit card reader, a smart card reader, etc. The SECD authorization system is connected via a hard wire connection or wirelessly, including Wi-Fi, to the SECD authorization center 16. A cell phone authorization transaction may also be used.

Each field panel 24 also includes a power supply 30, which is preferably an uninterruptible power supply. The power supply 30 is connected to and supplies power for a computer 26, a SECD authorization system 28, an Ethernet switch 32, and a display panel 34. The computer 26 is connected to the Ethernet switch 32 utilizing an Ethernet connection 36. Data and commands are communicated to and from the computer utilizing this connection. The display panel 34 is also connected to the Ethernet switch 32 utilizing an Ethernet connection 38. Data and commands are communicated through this connection.

The Ethernet switch 32 is connected to a medium converter 40. The medium converter 40 is connected to a fiber optic patch panel 42. The fiber optic patch panel in turn is connected to an Ethernet connection or fiber optic connection 44. This connection 44 enables communication of data and signals between the host parking facility 12 and the host operations building 14. The medium converter 40 is employed only when a fiber optic connection is utilized for connection 44.

The host operations building 14 is connected to the opposite end of connection 44 from the host parking facility 12. A fiber optic patch panel 80 is connected to the end of connection 44 as it enters the host operations building. A medium converter (fiber optic and Ethernet) 82 is connected to the fiber optic panel patch 80. A panel view 84 is connected to the medium converter 82. The panel view 84 can indicate the operations of the system at the host operations building 14. This panel view and associated software to operate is preferable but not critical to the operation of the entire system.

The medium converter 82 is also connected to a host accounting billing computer located in or associated with a host accounts billing department 88. The host accounting billing computer 86 is connected to the host corporate center 18 utilizing a wired or wireless connection 90.

Referring now to FIGS. 2A and 2B wherein the field panel 24 is illustrated schematically. A host monitoring system 46 is connected to the field panel 24 via a connection 48. Connection 48 enables the transfer of data and commands between field panel 24, which control the electrical power to the stands or charging pylons 22, and the authorization system 28 and a billing system that will be described herein after. The panel view display 34 and the computer 26 are also illustrated in FIG. 2. Each of the stands or charging pylons 22 has a individual/customer/first electrical connection 23, FIGS. 5B and 5E, which enable an individual to connect an electrical power cable 27, FIGS. 5C and 5D, from an electrically powered vehicle to the stand or charging pylon 22. This first electrical connection 23 permits electrical power, such as electricity, to be transferred from the stand or charging pylon 22 to the electrically powered vehicle 15 to charge or recharge the vehicle. Electrical power, such as electricity, is delivered from a source of electrical power (not shown) to the host parking facility 12 through a wire, electrical cable or connection 49(*a*), to Field Panel 24, through individual electrical breakers (not shown) in Field Panel 24, and then to each individual pylon via cable 49(*b*).

The stands or charging pylons 22 along with Field Panel 24 are controlled access metered electrical outlets capable of providing, recording, and reporting metered flow of electrical power to electrically powered vehicles to charge or recharge these vehicles. In a preferred embodiment of the present invention, one stand or charging pylon 22 is located adjacent a parking space for a vehicle. In the embodiment illustrated in FIG. 4 the stand or charging pylon 22 is located in front of a parking space for a vehicle. The stands or charging pylons can also be located in other areas and electrical connections can be provided so that electrically powered vehicle(s) can be electrically connected to these stand(s) or charging pylon(s) 22. It is possible that the charging pylons can be configured to service more than one vehicle at once.

FIGS. 5A-F illustrates a preferred embodiment of the stand or charging pylon 22. Each stand or charging pylon 22 communicates with and reports to the central computer system 46 (FIG. 2) either by a hardwire connection 48, wireless or Wi-Fi connection. Wi-Fi connections are preferably employed where Wi-Fi capabilities have already been installed. Each of the stands or charging pylons 22 allows the provider of the charging/recharging service, to control access to each of the stands or charging pylons to permit use by only authorized individuals. Also stands or charging pylons 22 allow the provider to limit the amount of electrical power dispensed by the charging pylons 22 and include the necessary safety precautions to limit liability for misuse or for inadvertent electrical shock.

Access to the stands or charging pylons 22 is controlled through the use of a lockable cover 25, FIGS. 5A-F. Release of the locking of this cover is controlled and authorized by a signal from the programmable logic computer 26, or the central computer located at the Host Monitoring System 46. This signal can also come from a central location of the parking facility management such as a registration desk, cashiers both or security post. Power lock 52 engages the cover 25 to hold the cover closed when access to the stand or charging pylon 22 has not been authorized. After access to use the stand or charging pylon 22 has been granted, power lock 52 is activated whereby cover 25 can be pivoted or opened such that the stand or charging pylon can be used to charge or recharge a vehicle. Furthermore, once the individual's access is authorized and the individual's charging cable 27 is plugged into the charging pylon first electrical connection 23, the Cover 25 must be closed and then will be automatically locked when position indicator 56 is satisfied. Electrical Charging is enabled only when Cover 25 is locked. Cover 25 also acts as a rain/weather cap which prevents moisture from coming in contact with the first electrical connection 23 and disabling the electrical service. Whenever an individual wants to utilize the stand or charging pylon 22 they would first pull their vehicle in close proximity to the stand 22. The distance from their vehicle to the stand or charging pylon 22 is determined by the length of the electrical cable 27.

Whenever an individual wants to utilize a stand or charging pylon 22 to charge or recharge their vehicle, the Ready Light 64 is illuminated, the Cover Lock Light 58 is illuminated, the LED display 67 reads "insert card", they insert a secure electronic content distributor (SECD), such as a bank credit/debit card and may include, hotel/motel room key cards, casino membership cards, store credit cards, employee or student identification cards, other forms of membership cards or any sort of specialized electronic parking identification cards authorized for use in the specific parking facility. The information on the SECD is communicated to the SECD authorization center 16 or an authorization center in the host operations building 14. In the event that a credit/debit card is utilized the computer 26 transmits the data extracted from the credit/debit card and transmits it to the SECD authorization center 16 via the automatic dialer 21. Upon receipt of proper authorization from SECD authorization center 16 or the authorization center in the host operations building 14 the programmable logic computer 26 sends a signal to unlock the power lock 52. In the event that authorization is not received from the SECD authorization center 16 or the authorization center, then the power lock 52 remains locked, LED display panel 67 reads "card not accepted", and access to stand or pylon 22 is denied. Authorization could be denied because an individual does not have enough credit authorized on his/her credit card. Authorization would also be denied if a stolen credit/debit card were used. Authorization would be denied if the specific SECD was not approved or was no-longer approved for use at the specific facility. Authorization would not be approved if the specific SECD had expired. Alternatively, the stand or charging pylon 22 could be activated by an employee of facility remotely or using a facility specific master SECD. An individual using the stand subsequent to this type of activation would be directed to the authorized parking spot or authorized stand or charging pylon 22 by blinking lights on the charging pylon 22. The individual can now utilize the authorized SCED card to gain access to the specific charging pylon 22 and obtain electrical power as described herein above.

Figures 5A, 5B:
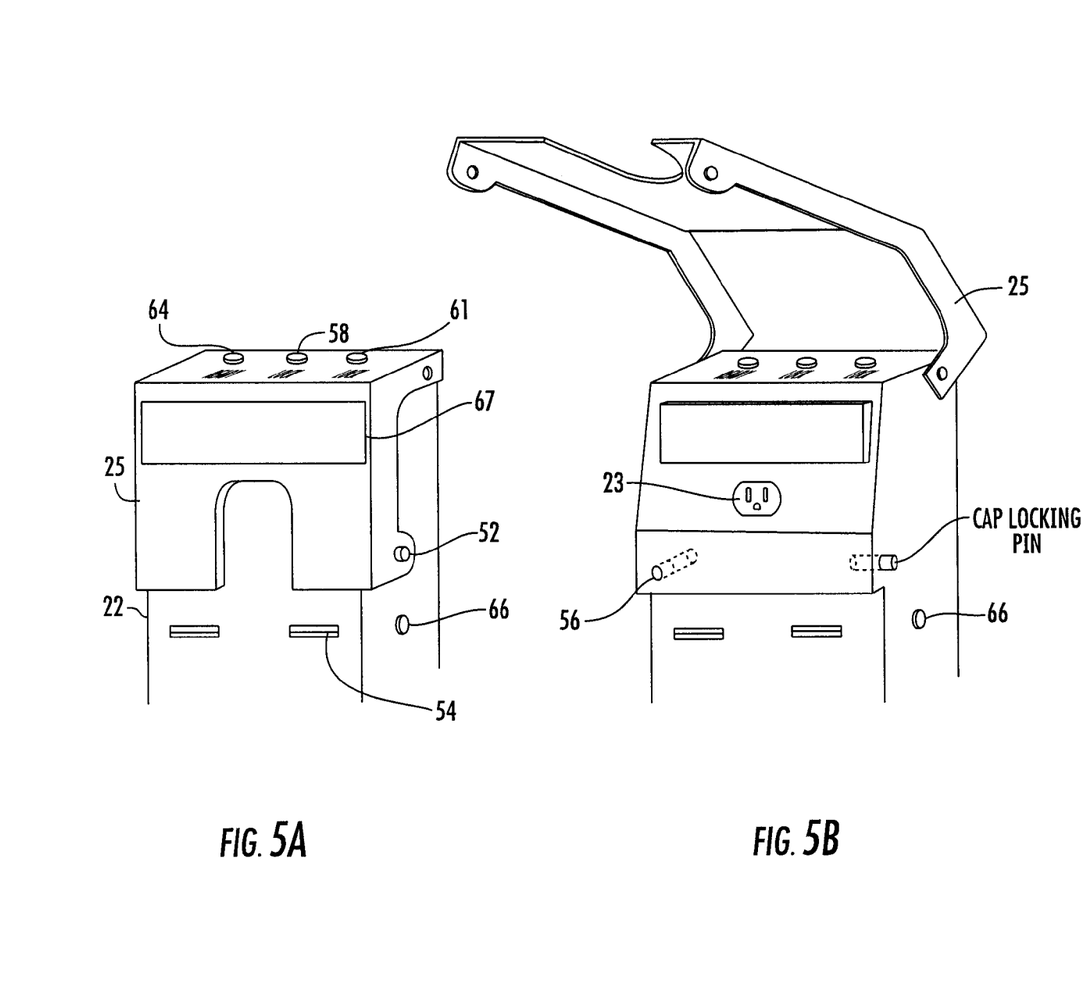
FIGS. 5A-F are perspective views of a charging pylon during various stages of its operation.
Figure 5C:
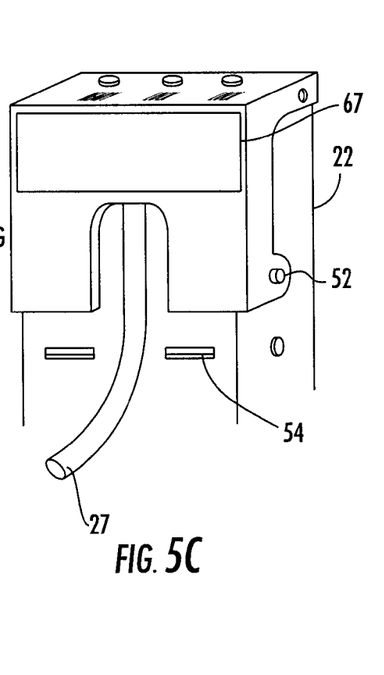
Figure 5D:
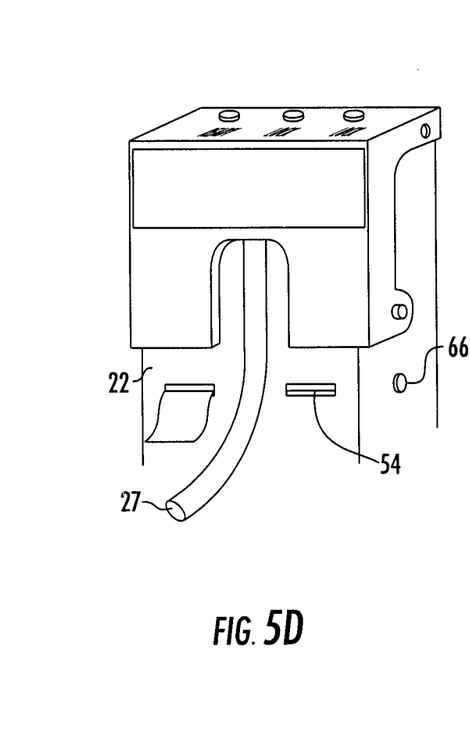
Figures 5E, 5F:
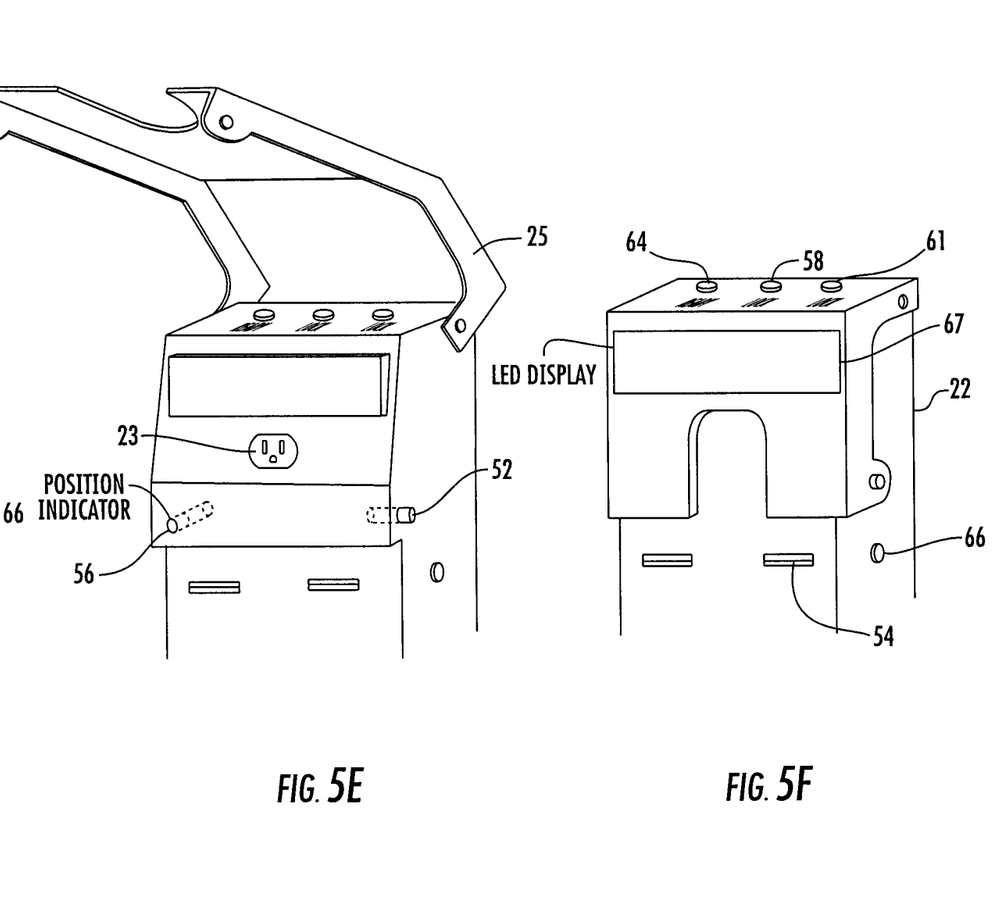

Upon being granted access to use the stand or charging pylon 22 the Cover 25 unlocked and the Lock Light is no longer illuminated, the Cover 25 is raised to the position illustrated in FIGS. 5B and 5E. Lights 58, 61 and 64 are activated or deactivated accordingly. The individual/operator of the electrically powered vehicle or other individual associated with the electrically powered vehicle 15 can now connect the vehicle to the stand or pylon 22 by inserting an electrical wire, cable or similar connection 27 that is capable of delivering electrical power from the charging pylon 22 to the vehicle 15, via first electrical connection 23 as illustrated in FIGS. 5C and 5D. Cover 25 can now be lowered into its operational position. In this position power lock 52 engages and locks cover down in this position, FIGS. 5C and 5D. Cover 25 is positioned over the end of electrical wire 27 where it is connected to the stand or charging pylon 22. When the cover 25 is locked down it prevents unauthorized individuals from disconnecting the electrical wire or cable 27 from the stand or pylon 22 and reconnecting their own electrical wire or cable and charging or recharging their vehicle while someone else is paying for the electrical power. A position indicator 56 sends a signal to the computer 26 indicating that the power lock is closed. The computer 26 then sends a signal to the power lock 52 to lock the lock and sends a signal to activate the indicator 58, preferably a red light, which indicates that the power lock is locked.

The computer 26 then activates the contacts or switch 50 which allows electrical power to be delivered or dispensed to the vehicle through the stand or pylon 22. The Charging indicator light 61 indicates that electrical power is being delivered or dispensed to the vehicle.

Each field panel 24 includes an electrical power flow indicator 57 which tracks the flow of electrical power from a power source to the control panel 24 and the individual stands or pylons 22. The flow indicator 57 sends a record of all of the individual electrical power uses and cumulative electrical power uses to the computer 26. Field Panel 24 also includes a control power "ON" indicator 60 and a control power "OFF" indicator 62. Indicators 60 and 62 indicate that electrical power is being supplied to the control panel 24 and stands or pylons 22. An emergency hand switch 66 is conveniently located on each stand 22 which may be operated by an individual to terminate the charging of the vehicle. The switch 66 can also be utilized in an emergency to stop the flow of electrical power. Hand Switch 68 can be used to energize and de-energize control power to Field Panel 24.

When the individual's vehicle is completely charged, completely recharged or charged to a level that is satisfactory to the individual the individual inserts the SCED into the SCED reader 54 again and the programmable logic computer 26 receives a signal that the individual is the authorized user. The power supply to pylon 22 is disabled via the automated breaker in Field Panel 24 (not shown), power lock 52 receives a signal from the central computer to unlock and the individual can remove his/her electrical wire or connector 27 from the stand or pylon 22.

After the charging/recharging process is complete or subsequent to the termination of the charging/recharging process by an individual, the programmable logic computer 26 sends a signal to the host monitoring system 46 or the host accounts billing computer 86. This signal includes the identification of the individual that has utilized the charging/recharging stand, the date and time of the start and completion of the electrical power transaction, the amount of electrical power consumed or dispensed, and the related cost of the electrical power that the Host will bill the individual or customer. The computer 26 is programmed by the host from the host monitoring system, the host operations building or the host corporate center for a unit cost or electrical power dispensed by the charging/recharging system.

After the individual's vehicle is completely charged the flow element 57 will indicate a minimal or zero amount of electrical power flow. Upon receipt of this indication or signal by the host monitoring system or host accounts billing computer the host can notify the individual by utilizing a variety of notification processes, such as telephone notification, cellular telephone notification, paging in a building or within a confined area, messaging systems, etc. While this is a preferred process it is not required for the operation of the charging/recharging system.

The individual can then go to the stand or pylon, if they are not already there, use the authorization system as described above, ensure that the cover 25 is unlocked, raise the cover, and disconnect their electrical connector from their vehicle from the first electrical connection of the stand or pylon 22. The individual will then close the locking cover over the electrical power output of the stand or pylon 22. The position sensor 56 then sends a signal to the computer 26 that the cover is closed and the computer sends another signal to the power lock 52 to lock the cover closed and activate the indicator 64 which indicates, preferably by a green light, that the system is energized are ready for use. The Ready indicator Light 64 is illuminated.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A system for charging electrically powered vehicles comprising;
   - a free standing electrical charging station having a power connection inlet coupled to a power source and an electrical connection output available for temporary coupling to a power cord used by an electric powered vehicle for battery charging;
   - a cover constructed and arranged to conceal said electrical connection output, said cover hinged to said charging station and includes an aperture sized to secure said power cord to said electrical connection output;
   - a position indicator to determine closure of said cover;
   - a locking pin assembly for securing said cover in a closed position while said position indicator is engaged, said locking pin assembly maintaining said cover in a closed position until an authorization to release the cover is received;
   - a secure electronic content distributor (SECD) instructing said locking pin to release said cover to permit insertion of said power cord into said electrical connection output for vehicle battery charging and engaging said locking pin to prevent removal of said power cord until SECD authorization is provided;
   - a card reader position on said charging station for accessing SECD and obtaining said authorization;
   - a recorder to determine the amount of power delivered to the vehicle and for transmitting a business transaction through a printer at the charging station and to a host center for a calculated amount to be charged through SECD;
   - wherein said cover is locked to prevent unauthorized individuals from accessing said electrical connection output or disconnecting the power cord until properly authorized, said charging station operated by a card reader coupled through SECD and providing a transaction summary at the charging station.

* * * * *